United States Patent
Koyama (10) Patent No.: US 6,848,411 B2
(45) Date of Patent: Feb. 1, 2005

(54) SECONDARY BALANCER OF VERTICAL ENGINE OF OUTBOARD MOTOR

(75) Inventor: Hideo Koyama, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 10/827,308

(22) Filed: Apr. 20, 2004

(65) Prior Publication Data

US 2004/0211383 A1 Oct. 28, 2004

(30) Foreign Application Priority Data

Apr. 22, 2003 (JP) ......................................... 2003-117285

(51) Int. Cl.[7] .............................................. F02B 75/06
(52) U.S. Cl. ................... 123/192.2; 123/184.57
(58) Field of Search ........................... 123/192.2, 195 P, 123/196 W, 184.57; 440/88 A, 900

(56) References Cited

U.S. PATENT DOCUMENTS

| | | | | |
|---|---|---|---|---|
| 5,309,877 A | * | 5/1994 | Shigedomi et al. | ...... 123/192.2 |
| 6,439,188 B1 | * | 8/2002 | Davis | ...................... 123/192.2 |

* cited by examiner

Primary Examiner—Noah P. Kamen
(74) Attorney, Agent, or Firm—Oblon, Spivak, McClelland, Maier & Neustadt, P.C.

(57) ABSTRACT

A secondary balancer is used for an outboard motor vertical in-line engine which includes a crankcase, a cylinder block and a cylinder head, which are arranged in this order from a front side of the engine (i.e., hull side of an outboard motor), a crankshaft placed in the engine in a substantially vertical direction, an intake pipe placed on one side of the engine, a throttle body and an intake silencer which are disposed on a front side of the crankcase, and a balancing device including a primary balancer and a second balancer. The secondary balancer includes a pair of balancer shafts disposed in a space formed between the crankcase and the intake silencer.

10 Claims, 5 Drawing Sheets

SECONDARY BALANCER OF VERTICAL ENGINE OF OUTBOARD MOTOR

BACKGROUND OF THE INVENTION

1. Field of the Invention

The present invention relates a secondary balancing device (balancer) of an outboard motor vertical type engine and the engine provided with such a secondary balancer.

2. The Related Art

A four-stroke-cycle engine is susceptible to vibration, which is caused by a reciprocating motion of a piston of a cylinder assembly of the engine. For the purpose of eliminating the vibration, a certain type of engine is provided with a balancer or balancing device (called "balancer" hereinlater). Such a balancer includes a balancer shaft with a balancer weight corresponding to the total mass of movable parts such as piston and connection rod of the engine so that rotation of the balancer shaft in conjunction with operation of the engine eliminates the vibration caused by the operation of the engine.

The above-mentioned balancer may include a primary balancer, to eliminate primary vibration, in which a vibration exciting force generates once during one turn of the crankshaft, and a secondary balancer, to eliminate a secondary vibration, in which a vibration exciting force generates twice during one turn of the crankshaft.

For example, an engine for an outboard motor is mounted in a state that a crankshaft is kept in the vertical direction, and the other structural components such as a crankcase, a cylinder block and a cylinder head are combined together so as to constitute the engine, i.e., vertical in-line engine.

With an arrangement of the secondary balancer in such an engine, Japanese Laid-Open Patent Publication No. HEI 10-184798 discloses a secondary balancer in which a right-hand secondary balancer shaft and a left-hand secondary balance shaft are arranged vertically on the opposite side surfaces of a cylinder block so that four cylinders formed in the cylinder block are located between these balancer shafts.

In the case of the dual shaft type-balancer, it is necessary to rotate the balancer shafts in the opposite directions to each other so as to eliminate the vibration exciting force in the perpendicular direction to the axial direction of the cylinder. However, in an arrangement in which the balancer shafts are disposed separately from each other on the opposite side surfaces of the cylinder block, the distance between the balancer shafts and the crankshaft, which serves as a driving source for rotating them, is widened, thus leading to complicated structures in the layout of the balancer driving system. Consequently, the number of the structural parts increases, resulting in the increased number of assembling steps and an increased total weight, thus being inconvenient and disadvantageous.

In addition, it is necessary to provide a housing for receiving and rotatably supporting the balancer shafts on the opposite sides of the cylinder block. Accordingly, the existing cylinder block cannot be used as it is, and it is required to manufacture a newly suitable cylinder block. As a result, the cost, especially, a capital investment considerably increases.

Furthermore, since the housings for the balancer shafts project from the side surfaces of the cylinder block, it is required to review the layout of peripherals. The outboard motor includes, to achieve requirement for miniaturization, an intake system, an exhaust system and a fuel system, as well as electrical components, which are put together around the engine. It may be further difficult to make a change in layout of the outboard motor.

SUMMARY OF THE INVENTION

An object of the present invention, which was made in view of the above-mentioned circumstances, is therefore to provide a secondary balancer of an outboard motor engine, which permits to achieve miniaturization and enables existing structural parts to be used as they are, and also provide an outboard motor-vertical in-line engine provided with such a secondary balancer.

This and other objects can be achieved according to the present invention by providing, in one aspect, a secondary balancer for an outboard motor vertical in-line engine which includes a crankcase, a cylinder block and a cylinder head, which are placed in this order from a front side of the engine (i.e., a hull side of a boat to which the outboard motor is mounted), a crankshaft disposed in the engine so as to extend in a substantially vertical direction, an intake pipe arranged on one side of the engine, a throttle body and an intake silencer, which are disposed on a front side of the crankcase in the engine, and a balancing device for eliminating vibration of the engine, the balancing device including a primary balancer and a secondary balancer, the second balancer comprising a pair of balancer shafts disposed in a space formed between the crankcase and the intake silencer.

In a preferred embodiment of this aspect, the secondary balancer may be housed in a balancer shaft housing separately formed from the crankcase and fixed on an outer side of the crankcase. Balancer shaft-gears for operatively connecting the pair of balancer shafts to each other may be arranged in the balancer shaft housing, a balancer drive sprocket is provided at a lower end of the crankshaft, and a balancer driven sprocket is disposed at a lower end of one of the paired balancer shafts, the balancer driven sprocket being operatively connected to the balancer drive sprocket by means of a balancer chain. Bearing bosses for rotatably supporting the paired balancer shafts in the balancer shaft housing may be disposed at positions corresponding, in a horizontal direction, to bearing portions formed on partition walls by which the engine is divided into a plurality of sections in a vertical direction, the bearing portions rotatably supporting the crankshaft. The bearing bosses may be provided therein with oil supply passages for lubrication of the balancer shafts, the oil supply passages communicating with a main oil gallery of the engine through oil communicating passages, which are formed in the cylinder block and the partition walls of the crankcase.

The paired balancer shafts may be disposed in a position corresponding to a cylinder in the cylinder block that is disposed in a vertically middle portion of the crankshaft in a side view of the engine.

A drive unit such as drive gear for rotating the balancer shafts may be arranged at a lower portion of the crankshaft and the balancer shafts.

A balancer shaft-drive gear may be disposed on a crankweb, which is formed on the crankshaft, and another balancer shaft-drive gear is disposed at a lower end of one of the paired balancer shafts, this one balancer shaft being disposed on a side opposite to the intake pipe arranged on the one side of the engine relative to an axial line of a cylinder.

In a more detailed aspect of the present invention, there may be provided a secondary balancer of an outboard motor-vertical in-line engine which includes a crankcase, a cylinder block and a cylinder head, which are arranged in this order from a front side of the engine, a crankshaft disposed in the engine in a substantially vertical direction, an intake pipe arranged on one side of the engine, a throttle body and an intake silencer, which are disposed on a front side of the crankcase, and a balancing device including a primary balancer and a secondary balancer, the secondary balancer comprising:

a pair of balancer shafts arranged in a space formed between the crankcase and the intake silencer;

a balancer shaft housing in which the pair of balancer shafts are received, the balancer shaft housing being separately formed from the crankcase and fixed on an outer side of the crankcase.

a drive gear, for rotating the balancer shafts, disposed at a lower end of the crankshaft and the balancer shafts;

a balancer shaft-drive gear provided on a crank-web, which is formed to the crankshaft, and another balancer shaft-drive gear disposed at a lower end of one of the paired balancer shafts, the one balancer shaft being disposed on a side opposite to the intake pipe;

balancer shaft-gears, for operatively connecting the paired balancer shafts to each other, disposed inside the balancer shaft housing; and bearing bosses, for rotatably supporting the paired balancer shafts in the balancer shaft housing, disposed in positions corresponding, in a horizontal direction, to bearing portions formed on partition walls by which the engine is divided into a plurality of sections in a vertical direction.

In a further aspect of the present invention, there may be provided an outboard motor vertical in-line engine comprising:

a crankcase, a cylinder block and a cylinder head, which are placed in this order from a front side of the engine;

a crankshaft placed in the engine in a substantially vertical direction;

an intake pipe placed on one side of the engine;

a throttle body and an intake silencer, both of which are placed on a front side of the crankcase; and a balancing device including a primary balancer and a secondary balancer, the secondary balancer being disposed in a space formed between the crankcase and the intake silencer, the secondary balancer including a pair of balancer shafts.

According to the secondary balancer of the outboard motor-vertical engine of the structure mentioned above, it is possible to achieve miniaturization of the whole outboard motor, to obviate the need for substantial change in layout of peripherals, to unitize the secondary balancer and to improve assembling working.

Furthermore, it is possible to arrange the center of gravity of the secondary balancer in the vicinity of the center of the engine in the horizontal direction, to improve the vibration eliminating effects, to utilize the region above the secondary balancer as a space for receiving the intake silencer, thus ensuring a sufficient capacity of the intake silencer, to place the center of gravity of the engine in a lower position, thus enhancing the drivability of a boat, and to return forcedly the lubricant oil, which is collected in the balancer shaft housing, into the crankcase through an oil suction effect by the drive gears.

It is also possible to form the oil communicating passages through which the oil supply passages communicate with the main gallery for lubrication of the balancer shafts, in the cylinder block and the partition walls of the crankcase, thus permitting supply of the lubricant oil also to the secondary balancer.

The nature and further characteristic features of the present invention will be made more clear from the following descriptions made with reference to the accompanying drawings.

DESCRIPTION OF THE PREFERRED EMBODIMENTS

Preferred embodiments of the present invention will be described hereunder in detail with reference to the accompanying drawings.

Figure 1:
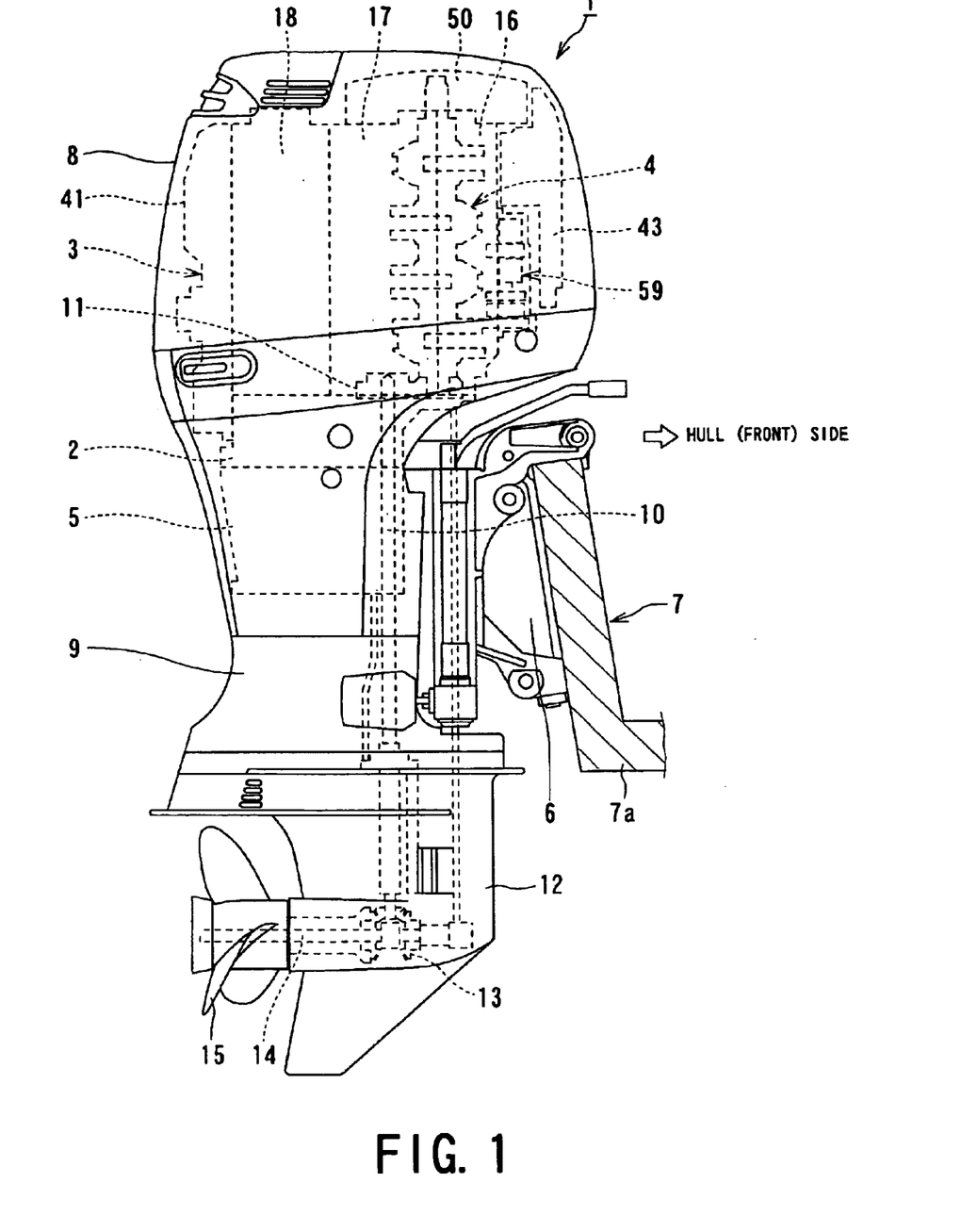
FIG. 1 is a right-hand side view illustrating an outboard motor, including a vertical in-line engine provided with a secondary balancer according to the first embodiment of the present invention.

With reference to FIG. 1 illustrating the first embodiment of the outboard motor mounted with a vertical in-line engine (vertical type engine) to which the present invention is applied, the outboard motor 1 is provided with an engine holder 2 and an engine 3 is mounted to an upper portion, in the illustrated state, of the engine holder 2. The engine 3 is a vertical type engine in which a crankshaft 4 is placed so as to extend in the vertical, i.e., perpendicular, direction.

An oil pan 5 is disposed below the engine holder 2. In addition, the outboard motor 1 has a clamp bracket 6 secured thereto, through which the outboard motor 1 is mounted to a transom 7a of a hull 7 of a boat to which the outboard motor is mounted. The engine 3 of the outboard motor 1 is surrounded by an engine cover, i.e., cowling 8.

A drive shaft housing 9, which is placed so as to cover the periphery and bottom of the oil pan 5, and a drive shaft 10 extends substantially vertically through the engine holder 2, the oil pan 5 and the drive shaft housing 9, in a position behind the crankshaft 4. The upper end of the drive shaft 10 is connected to the lower end of the crankshaft 4 through a reduction gear 11. The drive shaft 10 extends downward through the drive shaft housing 9 so as to drive a propeller 15 serving as a propelling device through a bevel gear 13 and a propeller shaft 14, which are received in a gear case 12 provided under the drive shaft housing 9.

Figure 2:
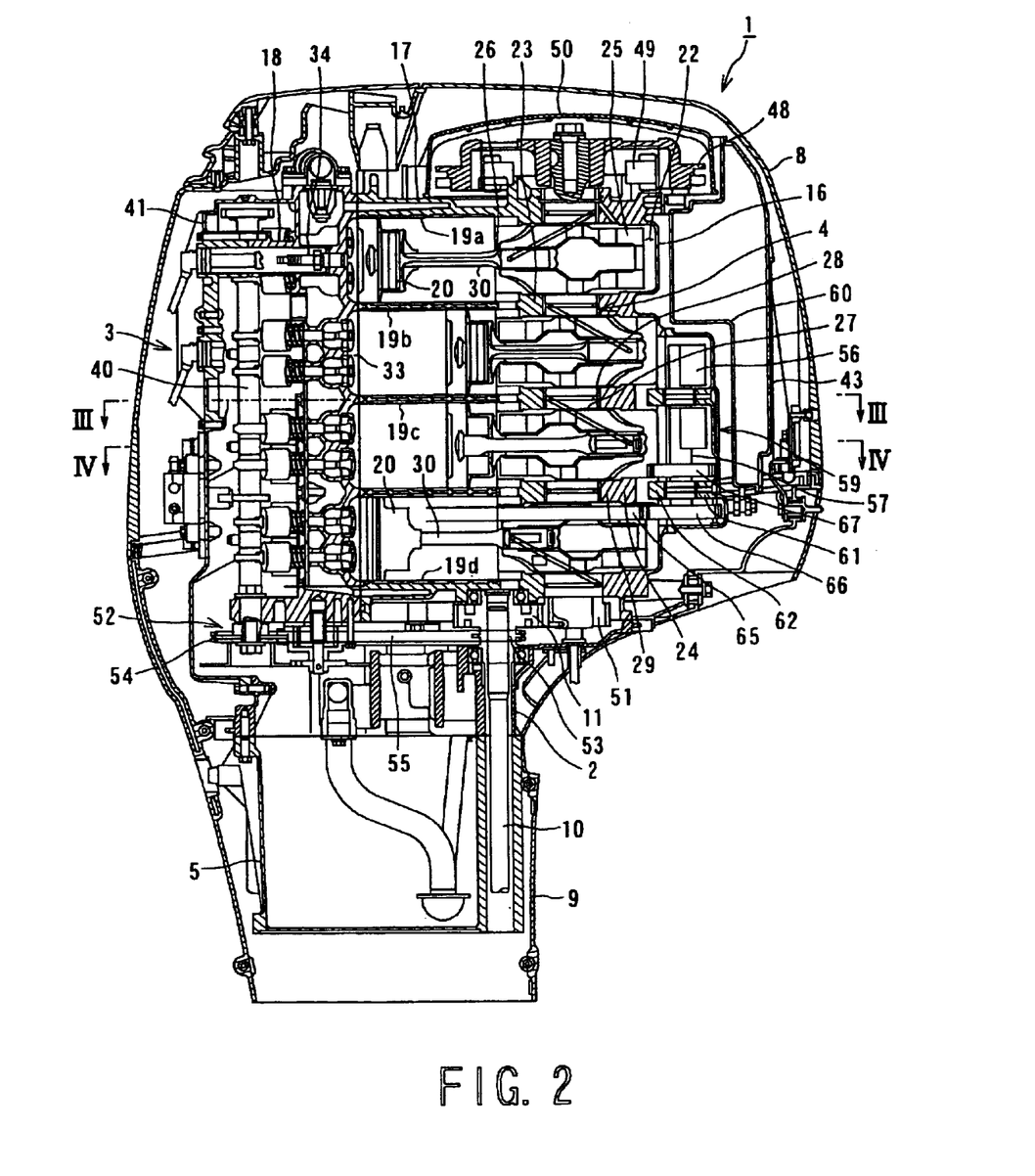
FIG. 2 is a vertical sectional view of the central portion of the outboard motor engine.
Figure 3:
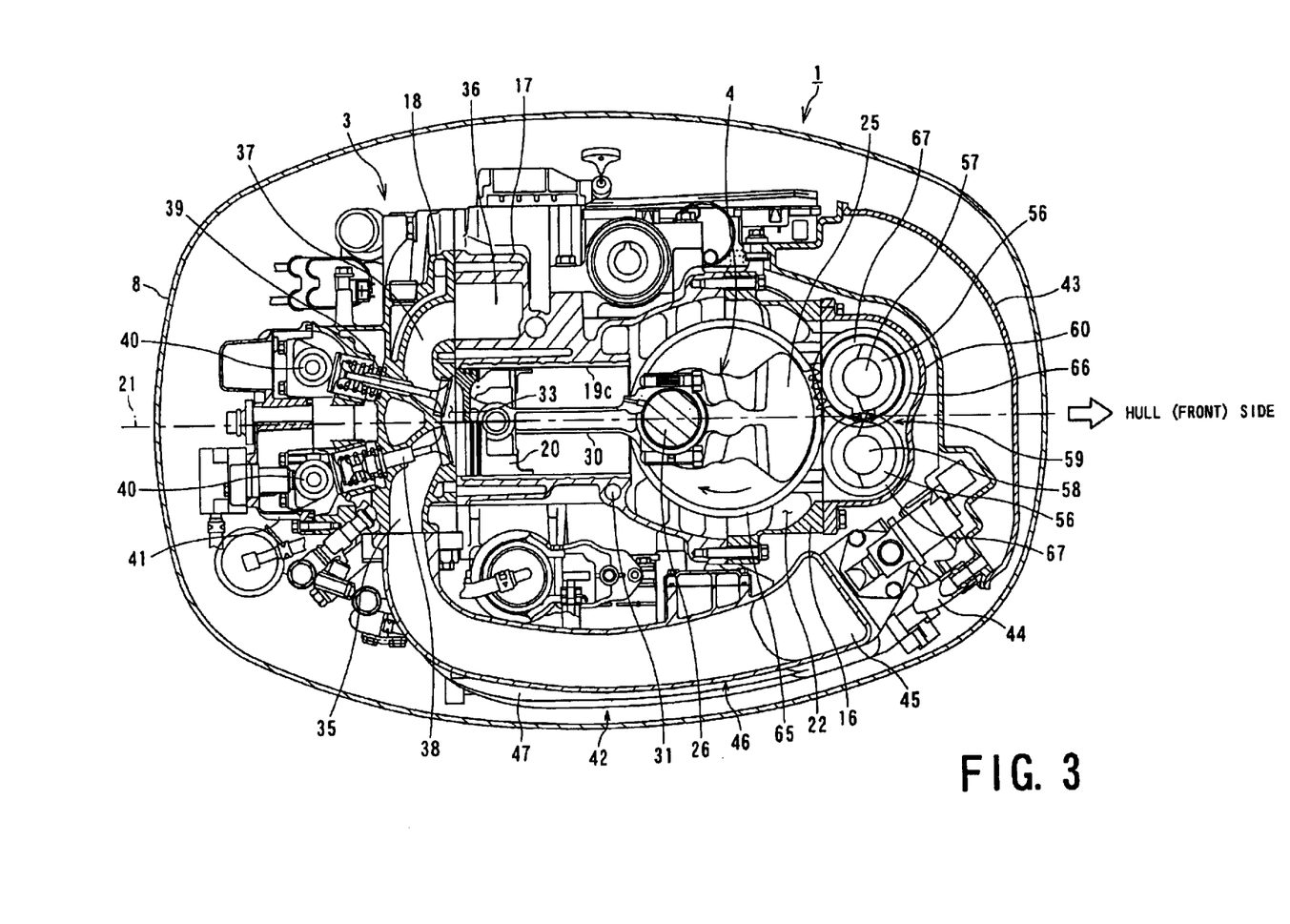
FIG. 3 is a sectional view taken along the line III—III in FIG. 2.
Figure 4:
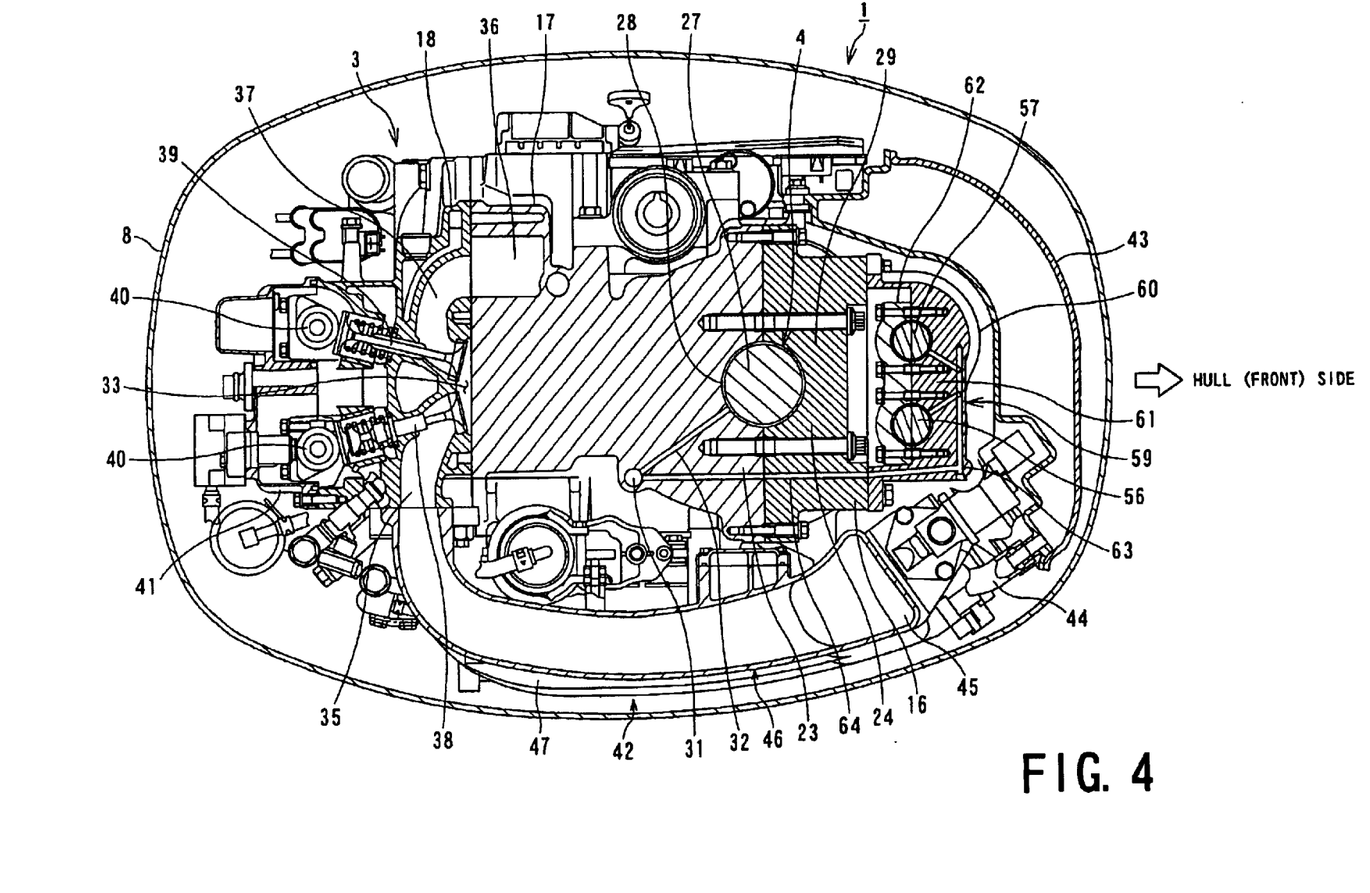
FIG. 4 is a sectional view taken along the line IV—IV in FIG. 2.

With reference to FIGS. 2 to 4, the engine 3 mounted in the outboard motor 1 is a water-cooled in-line 4-cylinder engine, which includes, for example, a crankcase 16, a cylinder block 17 and a cylinder head 18, which are arranged in this order from the hull (front) side of the outboard motor engine.

The crankcase 16 is disposed on the right-hand side in FIGS. 1 and 2, i.e., on the hull side, and the cylinder block 17 is arranged behind the crankcase 16, on the left-hand side in FIGS. 1 and 2. The cylinder head 18 is placed behind the cylinder block 17.

The lower surfaces of the cylinder head 18, the cylinder block 17 and the crankcase 16 are substantially flush with each other, and these members are mounted on the upper surface of the engine holder 2, as shown in FIG. 2.

The cylinder block 17 is provided with four cylinders 19a to 19d, which are arranged in the cylinder block 17 so as to extend in the horizontal direction and align in the vertical direction. A piston 20 is inserted in each of the cylinders 19a to 19d so as to be slidable along the central axial line 21 thereof. The crankcase 16 is provided, at positions between the cylinder block 17 and the end wall of the crankcase 16, with crank chambers 22, which are separated from each other by partition wall sections 23, 24 and aligned in the vertical direction so as to correspond to the respective cylinders 19a to 19d.

The crankshaft 4 is disposed between the joining or mating surfaces of the crankcase 16 and the cylinder block 17. The crankshaft 4 has a plurality of pairs of crank-webs 25, which are formed thereon as the primary balancer, so as to correspond to the respective cylinders. In each pair of crank-webs 25, the crank-webs 25 are provided on the opposite sides of a crank pin 26. One of the paired crank-webs 25 and one of the adjacent paired crank-webs 25 are connected to each other by a journal portion 27.

The crankshaft 4 is rotatably supported at the respective journal portions 27 thereof by bearing 28 disposed on bearing portions 29 formed to the partition wall sections 23, 24, which are formed between the joining or mating surfaces of the cylinder block 17 and the crankcase 16. Each of the crank pins 26 of the crankshaft 4 is connected to the piston through the connecting rod 30 so as to convert a reciprocating motion of the piston 20 into a rotational motion of the crankshaft 4.

Furthermore, as shown in FIG. 4, in detail, the cylinder block 17 has a main gallery 31 for supplying lubricant oil, which extends in the vertical direction of the cylinder block 17. An oil supply passage 32 extends from the above-mentioned main gallery 31 in the partition wall section 23, which is located on the side of the cylinder block 17, to the bearing portions 29 by which the crankshaft 4 is rotatably supported.

The cylinder head 18 is formed with combustion chambers 33 so as to correspond to the cylinders 19a to 19d. Ignition plugs 34 are connected to the cylinder head 18 form the outside thereof so as to correspond to the respective combustion chambers 33. The cylinder head 18 is provided with intake ports 35, which communicate with the above-mentioned combustion chambers 33, and exhaust ports 37, which communicate with exhaust passages 36 formed in the cylinder block 17. In addition, the cylinder head 18 is provided with intake valves 38 and exhaust valves 39 incorporated therein so as to open and close the intake ports 35 and the exhaust ports 37. Further, a pair of valve-driving (i.e., intake and exhaust) camshafts 40 for opening and closing the intake and exhaust valves 38 and 39 are disposed in parallel with the crankshaft 4 on the rear side of the cylinder head 18. The cylinder head 18 is covered with a head cover 41.

The engine 3 is provided with an intake device 42 including an intake silencer 43, a throttle body 44, a surge tank 45 and an intake manifold 46. This intake device 42 is disposed on one side of the engine, i.e., in a region from the front side of the engine 3 to the right-hand side thereof in the embodiment of the present invention.

The throttle body 44 is arranged in the vicinity of the crankcase 16 of the engine 3 and, for example, on the right and front side thereof. The surge tank 45 is also arranged on the downstream side (i.e., rear side) of the throttle body 44 and the right and front side of the crankcase 16. A plurality of intake pipes 47, which constitute the intake manifold 46, extend from the surge tank 45 rearward in the outer side of the cylinder block 17 to the respective cylinders, so as to be connected to the respective intake ports 35 formed in the cylinder head 18.

The intake silencer 43 for reducing intake noise has a shape capable of being accommodated in a space between the cowling 8 and the front side of the engine 3. The intake silencer 43 is connected to the upstream end (i.e., the front side) of the throttle body 44.

The upper end of the crankshaft 4 projects upward on the upper side of the engine 3 as shown in FIG. 2. The projected upper end of the crankshaft 4 is connected to a flywheel 48 and a magnetoelectric generator 49, which are surrounded with a protection cover 50.

As shown in FIG. 2, the crankshaft 4 and the drive shaft 10 are placed so that the respective central axes thereof offset from each other. More specifically, the central axis of the crankshaft 4 lies on the central axial line 21 of the cylinder (see FIG. 3) in a plan view of the engine, and the central axis of the drive shaft 10 deviates toward the rear side (i.e., the side of the cylinder head 18) from the central axis of the crankshaft 4.

The lower end of the crankshaft 4 projects downward in the lower portion of the engine 3, and the projected lower end of the crankshaft 4 is fitted forcedly into a crank gear 51. The reduction gear 11, engaging with the above-mentioned crank gear 51, is connected, for example through a spline-connection, to the upper end of the drive shaft 10, which projects upward from the engine holder 2 so as to be concentric with the drive shaft 10. Rotation of the crankshaft 4 causes the rotational force to be transmitted from the crank gear 51 to the reduction gear 11 for rotating the drive shaft 10.

A camshaft driving mechanism 52 for transmitting the rotational force of the crankshaft 4 to the camshafts 40 to rotate the camshafts 40 is arranged in a space between the lower portion of the engine 3 and the upper surface of the engine holder 2. The camshaft driving mechanism 52 is a chain-driving type and composed of a timing sprocket 53 formed integrally with the lower portion of the above-mentioned reduction gear 11 to drive the camshafts 40, a pair of cam sprockets 54 provided at the lower ends of the camshafts 40 projecting from the lower surface of the engine 3 so as to be rotatable together with these camshafts 40, and an endless timing chain 55 extending between these sprockets 53, 54.

The above-described engine 3 is provided with a balancing device for eliminating vibration caused by the reciprocating motion of the pistons 20. The balancing device includes the primary balancer and also includes the secondary balancer, in which balancer shafts 57, 58 are provided with balancer weights 56 corresponding to the total mass of movable parts such as the pistons 20 and connection rods 30 so that rotation of the balancer shafts in conjunction with operation of the engine 3 eliminates the vibration caused by the operation of the engine 3.

The secondary balancer 59 is disposed in a space between the crankcase 16 and the intake silencer 43, on the front side of the crankcase 16 in the plan view of the engine, so that the front side of the secondary balancer 59 is surrounded by the intake silencer 43 as shown in FIG. 3. More specifically, the secondary balancer 59 is disposed at a position corresponding to the central portion of the crankshaft 4 in the longitudinal direction thereof, in the side view of the side of the engine, and namely, at the position corresponding to the second and third cylinders 19b and 19c from the top, so that the upper side of the secondary balancer 59 is surrounded by the intake silencer 43, in the described embodiment of the present invention.

The secondary balancer 59 includes a pair of balancer shafts 57, 58, which are arranged in parallel with the crankshaft 4. These balancer shafts 57, 58 are aligned in the direction perpendicular to the axial line (axis) 21 of the cylinder. Each of the balancer shafts 57, 58 has a balancer weight 56 formed integrally therewith.

The pair of balancer shafts 57, 58 are rotatably supported on the front surface of the crankcase 16 in the state of being received in a balancer shaft housing 60, which is formed separately from the crankcase 16. The balancer shaft housing 60 is provided, at the upper and lower portions in the inside thereof, with bearing bosses 61 projecting toward the crankcase 16. The pair of balancer shafts 57, 58 are rotatably supported by the bearing bosses 61 and bearing cap members 62 in the balancer shaft housing 60.

The bearing bosses 61 and the corresponding bearing cap members 62 are disposed in places corresponding, in the horizontal direction, to the bearing portions 29 for the crankshaft 4, which are formed on the partition wall sections 23, 24, by which the crank chamber 22 is divided into sections in the vertical direction. The above-mentioned bearing boss 61 is provided therein with oil supply passages 63 extending to the contact surfaces of the balancer shafts 57, 58 with the bearing boss 61. The partition wall section 23 of the cylinder block 17 and the partition wall section 24 of the crankcase 16 are provided therein with oil communicating passages 64 through which the oil supply passages 63 communicate with the main gallery 31.

A balancer drive gear 65, which serves as the drive gear for the balancer shaft, is formed integrally with the lower portion of the crankshaft 4, i.e., with the crank-web 25 of the crankshaft 4 of this embodiment, corresponding to the fourth cylinder 19d from the top side. A balancer driven gear 66, which serves as the drive gear for the other balancer shaft and is operatively connected to the balancer drive gear 65, is provided at the lower end of the balancer shaft 57 of the pair of balancer shafts 57, 58 so as to be rotatable with the balancer shaft 57. The balancer shaft 57 is arranged on the opposite side to the intake manifold 46 which is disposed on the side of the engine 3, relative to the axial line 21 of the cylinder.

The pair of balancer shafts 57, 58 are provided with balancer shaft gears 67 so as to be engaged with each other. The gear ratio of the balancer drive gear 65 to the balancer driven gear 66 is set as "2:1" so that the balancer shaft 57 having the balancer driven gear 66 rotates at a speed as twice as much as the crankshaft 4. The gear ratio of one of the balancer shaft gears 67 to the other thereof is set as "1:1" so that the balancer shaft gears 67 rotates at the same speed in the opposite directions to each other.

Figure 5:
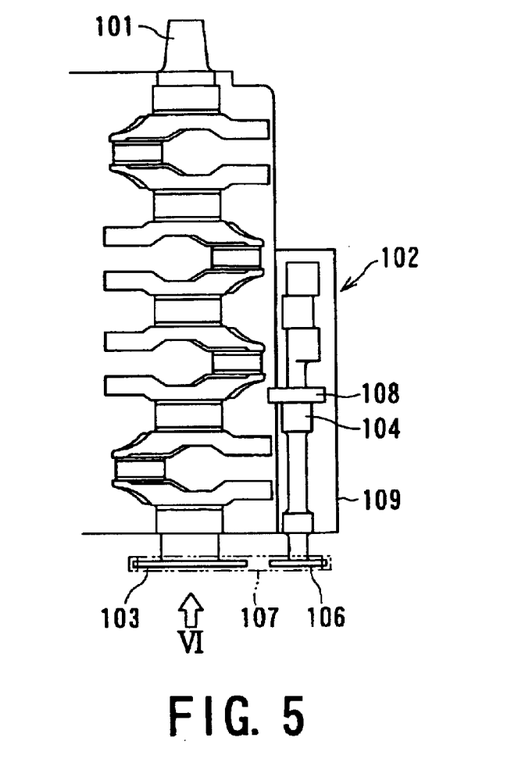
FIG. 5 is a side view illustrating a crankshaft and a secondary balancer according to the second embodiment of the present invention.
Figure 6:
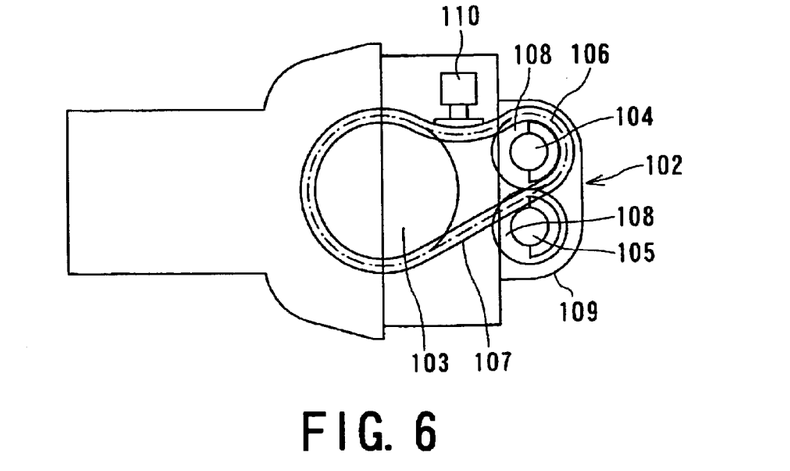
FIG. 6 is a side view of the crankshaft and the secondary balancer, viewed from a direction "VI" in FIG. 5.

FIG. 5, which shows the second embodiment of the present invention, is a side view illustrating the crankshaft 101 and the secondary balancer 102. FIG. 6 is a side view of the crankshaft 101 and the secondary balancer 102, viewed from a direction "VI" in FIG. 5.

In the first embodiment of the present invention, the balancer shafts 57, 58 are driven by the balancer drive gear 65 of the crank-web 25, whereas in the second embodiment of the present invention, the crankshaft 101 is provided at its lower end with a balancer drive sprocket 103, one of the balancer shafts 104, 105 is provided at its lower end with a balancer driven sprocket 106, and a single endless balancer chain 107 is disposed so as to extend between these sprockets 103, 106. Balancer shaft gears 108 are provided on the respective balancer shafts 104, 105 in an operative connection to each other and received in a balancer shaft housing 109. A tension device 110 is also disposed so as to maintain a proper tension of the balancer chain 107.

The operation of the described embodiments of the present invention will be described below.

The dual shaft type secondary balancer 59 is disposed in the space defined between the crankcase 16, which is disposed on the front side of the engine, and the intake silencer 43, which is disposed on the front side of the crankcase 16. Such an arrangement of the secondary balancer 59 prevents the engine from being upsizing, thus making it possible to realize miniaturization of the entire structure of the outboard motor 1 and obviate the need for substantial change in layout of peripherals.

The secondary balancer 59 is arranged on the outer surface of the crankcase 16, for example, on the front surface thereof so as to be received in the balancer shaft housing 60, which is formed independently from the crankcase 16. This makes it possible to unitize the secondary balancer 59, which can contribute the improvement in the engine assembling working. If the secondary balancer 59 is not required, substitution of a cover, not shown, for the balancer shaft housing 60, which is to be secured to the crankcase 16, would be made, thus facilitating a replacing operation between the different types of engines.

In addition, no working is required for the cylinder block 17 having the complicated structure, thus permitting the existing cylinder block to be usable as it is. Accordingly, the present invention can be applied merely by performing design changes to the crankcase 16 having the simple structure.

In addition, the secondary balancer 59 is disposed at the position corresponding to the central portion of the crankshaft 4 in the longitudinal direction thereof, in the side view of the engine, and namely, in the position corresponding to the second and third cylinders 19b, 19c from the top in the embodiment of the present invention. This makes it possible to place the center of gravity of the secondary balancer 59 in the vicinity of the center of the engine 3 in the horizontal direction so as to improve the vibration eliminating effects and utilize the region above the secondary balancer 59 as a space for receiving the intake silencer 43, thus ensuring a sufficient capacity of the intake silencer 43.

The drive gears (i.e., the balancer drive gear 65 and the balancer driven gear 66) for driving the balancer shafts 57, 58 are disposed on the lower sides of the crankshaft 4 and the balancer shaft 57. This makes it possible to place the center of gravity of the engine 3 to the lower position, thus enhancing the drivability of a boat. Furthermore, it is also possible to return forcedly the lubricant oil, which is collected in the balancer shaft housing 60, into the crankcase 16 through an oil suction effect by the drive gears.

Although the drive gear for the balancer shafts 57, 58 becomes larger in order to rotate the balancer shafts 57, 58 at a speed as twice as much as the crankshaft 4, the balancer drive gear 65, which serves as the drive gear for the balancer shaft, is provided at the crank-web 25, on the one hand. On the other hand, the balancer driven gear 66, which serves as the drive gear for the other balancer shaft and is operatively connected to the balancer drive gear 65, is provided at the lower end of the balancer shaft 57, which is placed on the opposite side to the intake manifold 46 placed on the side of the engine 3, relative to the axial line 21 of the cylinder. This makes it possible to dispose the throttle body 44 in the vicinity of the intake manifold 46 side of the crankcase 16, thus also achieving miniaturization of the engine 3.

In addition, the bearing bosses 61 and the corresponding bearing cap members 62, by which the pair of balancer shafts 57, 58 are rotatably supported in the balancer shaft housing 60, are disposed in places corresponding, in the horizontal direction, to the bearing portions 29 for the crankshaft 4. This makes it possible to form the oil supply passages 63 in the baring bosses 61, on the one hand, and to form the oil communicating passages 64 through which the above-mentioned oil supply passages 63 communicate with the main gallery 31, in the partition wall section 23 of the cylinder block 17 and the partition wall section 24 of the crankcase 16, on the other hand. As a result, it is possible to also supply the lubricant oil to the secondary balancer 59, which is provided separately from the crankcase 16.

The balancer shaft gears 108, which operatively connects the balancer shafts 104, 105 to each other, are received in the balancer shaft housing 109, and the crankshaft 101 is provided at its lower end with the balancer drive sprocket 103. One of the balancer shafts 104, 105 is provided at its lower end with the balancer driven sprocket 106, and the balancer chain 107 is disposed so as to extend between these sprockets 103, 106. This makes it possible to eliminate the need to place the balancer driven gear 66 having the relatively larger diameter in the balancer shaft housing 109, thus achieving miniaturization of the engine 3. In addition, there is no need to return the lubricant oil into the crankcase 16, thus reducing mechanical loss.

It is to be noted that the present invention is not limited to the described embodiments and many other changes and modifications may be made without departing from the scopes of the appended claims.

What is claimed is:

1. A secondary balancer for an outboard motor-vertical in-line engine which includes a crankcase, a cylinder block and a cylinder head, which are arranged in this order from a hull side of a boat to which the outboard motor is mounted, a crankshaft disposed in the engine so as to extend in a substantially vertical direction, an intake pipe arranged on one side of the engine, a throttle body and an intake silencer, which are disposed on a front side of the crankcase in the engine, and a balancing device for eliminating vibration of the engine, said balancing device including a primary balancer and a secondary balancer, said second balancer comprising a pair of balancer shafts disposed in a space formed between the crankcase and the intake silencer.

2. A secondary balancer according to claim 1, wherein said secondary balancer is housed in a balancer shaft housing independently formed from the crankcase and mounted on an outer side of the crankcase.

3. A secondary balancer according to claim 2, wherein balancer shaft-gears for operatively connecting said pair of balancer shafts to each other are arranged in the balancer shaft housing, a balancer drive sprocket is provided at a lower end of the crankshaft, and a balancer driven sprocket is disposed at a lower end of one of the paired balancer shafts, said balancer driven sprocket being operatively connected to the balancer drive sprocket by means of a balancer chain.

4. A secondary balancer according to claim 2, wherein bearing bosses for rotatably supporting the paired balancer shafts in the balancer shaft housing are disposed at positions corresponding, in a horizontal direction, to bearing portions formed on partition walls by which the engine is divided into a plurality of sections in a vertical direction, said bearing portions rotatably supporting the crankshaft.

5. A secondary balancer according to claim 4, wherein said bearing bosses are provided therein with oil supply passages for lubrication of the balancer shafts, said oil supply passages communicating with a main oil gallery of the engine through oil communicating passages, which are formed in the cylinder block and the partition walls of the crankcase.

6. A secondary balancer according to claim 1, wherein said pair of balancer shafts are placed in a position corresponding to a cylinder in the cylinder block which is disposed in a vertically middle portion of the crankshaft in a side view of the engine.

7. A secondary balancer according to claim 1, wherein a drive unit for rotating the balancer shafts is arranged at a lower portion of the crankshaft and the balancer shafts.

8. A secondary balancer according to claim 1, wherein a balancer shaft-drive gear is disposed on a crank-web, which is formed on the crankshaft and another balancer shaft-drive gear is disposed at a lower end of one of the paired balancer shafts, said one balancer shaft being disposed on an opposite side to the intake pipe arranged on the one side of the engine, relative to an axial line of a cylinder.

9. A secondary balancing device for an outboard motor-vertical in-line engine which includes a crankcase, a cylinder block and a cylinder head, which are arranged in this order from a front side of the engine, a crankshaft disposed in the engine in a substantially vertical direction, an intake pipe arranged on one side of the engine, a throttle body and an intake silencer, which are disposed on a front side of the crankcase, and a balancing device including a primary balancer and a secondary balancer, said secondary balancer comprising:
   a pair of balancer shafts arranged in a space formed between the crankcase and the intake silencer;
   a balancer shaft housing in which the pair of balancer shafts are received, said balancer shaft housing being independently formed from the crankcase and fixed on an outer side of the crankcase.
   a drive gear, for rotating the balancer shafts, disposed at a lower end of the crankshaft and the balancer shafts;
   a balancer shaft-drive gear provided on a crank-web, which is formed to the crankshaft, and another balancer shaft-drive gear disposed at a lower end of one of the paired balancer shafts, said one balancer shaft being disposed on a side opposite to the intake pipe;
   balancer shaft-gears, for operatively connecting the paired balancer shafts to each other, disposed inside the balancer shaft housing; and
   bearing bosses, for rotatably supporting the paired balancer shafts in the balancer shaft housing, disposed in positions corresponding, in a horizontal direction, to bearing portions formed on partition walls by which the engine is divided into a plurality of sections in a vertical direction.

10. An outboard motor vertical in-line engine comprising:
   a crankcase, a cylinder block and a cylinder head, which are arranged in this order from a hull side of a boat to which the outboard motor is mounted;
   a crankshaft placed in the engine in a substantially vertical direction;
   an intake pipe arranged on one side of the engine;
   a throttle body and an intake silencer, both of which are disposed on a front side of the crankcase; and
   a balancing device including a primary balancer and a secondary balancer, said secondary balancer being disposed in a space formed between the crankcase and the intake silencer, said secondary balancer comprising a pair of balancer shafts.

* * * * *